United States Patent [19]

Nishino et al.

[11] Patent Number: 4,603,181
[45] Date of Patent: Jul. 29, 1986

[54] IN-MOLD COATING COMPOSITION

[75] Inventors: Kenichi Nishino, Ibaraki; Hiromu Miyashita; Tadao Fukui, both of Suita, all of Japan

[73] Assignee: Takeda Chemical Industries, Ltd., Osaka, Japan

[21] Appl. No.: 719,738

[22] Filed: Apr. 3, 1985

[30] Foreign Application Priority Data

Apr. 17, 1984 [JP] Japan .................................. 59-77818

[51] Int. Cl.$^4$ ............................................. C08L 63/10
[52] U.S. Cl. .................................... 525/528; 525/530; 525/531; 525/920; 526/260
[58] Field of Search ............... 525/528, 920, 531, 530; 526/260

[56] References Cited

U.S. PATENT DOCUMENTS

| T100,701 | 6/1981 | Kuehn | 428/422.8 |
|---|---|---|---|
| 4,081,578 | 3/1978 | Van Essen | 428/63 |
| 4,288,569 | 9/1981 | Rottmaier | 525/113 |
| 4,331,735 | 5/1982 | Shanoski | 428/423.7 |
| 4,374,238 | 2/1983 | Shanoski | 528/50 |
| 4,422,996 | 12/1983 | Navin | 264/255 |

FOREIGN PATENT DOCUMENTS 39588  11/1981  European Pat. Off. .
1590255  5/1981  United Kingdom .

*Primary Examiner*—John C. Bleutge
*Assistant Examiner*—Patricia Short
*Attorney, Agent, or Firm*—Wenderoth, Lind & Ponack

[57] ABSTRACT

One-package type composition for in-mold coating is disclosed which contains (a) a urethane compound having at least two acryloyloxy or methacryloyloxy groups at the terminal and at least one 1-oxa-3,5-diazine-2,4,6-trione ring in the molecule, (b) an ester resin having at least one reactive double bond prepared by the reaction of an epoxy compound with an unsaturated carboxylic acid and (c) a vinyl monomer. The composition is useful for coating the molded product from fiberglass reinforced thermosetting polyester resin compounds within a mold. The composition, when coated, shows excellent adherence to the molded product and excellent water resistance.

4 Claims, No Drawings

IN-MOLD COATING COMPOSITION

The present invention relates to one-package type compositions for in-mold coating, which are used to coat a molded product, particularly the molded product from fiber-reinforced thermosetting plastics. The molded product of fiber-reinforced thermosetting plastics (FRP) has attracted considerable attention as a replacement material for steel plate, because of its enhanced rigidity, strength, chemical resistance, water resistance, moldability, etc., and has been used in every industrial field. For example, the molded product from fiber-glass reinforced thermosetting polyester resin compounds (e.g., SMC, BMC, etc.) has been applied to automotive exterior panels, electrical appliances, etc. Generally, the molded product for such purposes is often painted on its surface. The molded product prepared under heat compression inherently has a defect of lacking surface smoothness, such as cavities, pinholes, microcrackings, sinkers and warpings. The painting of such molded product, in many instances, results in poor appearance, such as blistering developed on the coating film and poor adhesion of the paint to the molded product.

In order to eliminate such defects, there have been proposed a variety of compositions for undercoating. Recently, an in-mold coating method has been developed (e.g., U.S. Pat. No. 4,081,578, etc.) and various in-mold coating compositions are proposed for the coating method (e.g., British Pat. No. 1,590,255, European Pat. No. 39,588, U.S. No. T100701, etc.). These in-mold coating compositions, especially in the case of one-package type compositions with improved processability, do not necessarily have sufficient adherence toward the surface of the molded products. In view of the above situation, the inventors have made a study on a one-package type composition for in-mold coating with superior adherence as well as good processability.

Thus, the present invention is directed to a one-package type composition for in-mold coating, which contains (a) a urethane compound having at least two terminal acryloyloxy or methacryloyloxy groups and at least one 1-oxa-3,5-diazine-2,4,6-trione ring in the molecule, (b) an ester resin having at least one reactive double bond prepared by the reaction of an epoxy compound with an unsaturated carboxylic acid and (c) a vinyl monomer.

The component (a) usable in the present invention can be produced by reacting a polyisocyanate compound having at least one 1-oxa-3,5-diazine-2,4,6-trione ring (hereinafter referred to simply as "trione ring") in the molecule (I) with an active hydrogen compound (II) at an isocyanate active hydrogen ratio in the range of 1.3 to 4.0, preferably 1.5 to 2.0, to produce an isocyanate-terminated urethane prepolymer having the trione rings in the molecule and, then, reacting the prepolymer with a compound having hydroxyl and acryloyloxy (or methacryloyloxy) groups in the molecule (III) at an isocyanate/hydroxyl ratio in the range of 1.0 to 0.5, preferably 0.95 to 0.8.

The above-mentioned reactions are both urethane formation reactions, and are carried out under a nitrogen stream at 70° to 110° C. in the presence of a urethane forming catalyst normally used, for example, such organometallic compounds as dibutyltin dilaurate.

The polyisocyanate compound having at least one trione ring (I) can be produced by reacting an aliphatic, alicyclic or aralkyl polyisocyanate with carbon dioxide. Such aliphatic, alicyclic and aralkyl polyisocyanate includes, for example, di- or triisocyanates, such as tetramethylene diisocyanate, hexamethylene diisocyanate, $\omega,\omega'$-diisocyanatodipropyl ether, 2,6-diisocyanatocaproic acid ester, 1,6,11-triisocyanatoundecane, bis(isocyanatomethyl)cyclohexane, bis(isocyanatoethyl)cyclohexane, xylylene diisocyanate and bis(2-isocyanatoethyl)benzene, as well as their dimers or trimers. These polyisocyanates may be used alone or as mixtures thereof. Also, there may suitably be mixed monoisocyanates, such as methyl isocyanate, ethyl isocyanate, n-butyl isocyanate, $\omega$-chlorohexyl isocyanate, cyclohexyl isocyanate, cyclohexylmethyl isocyanate, benzyl isocyanate and phenylethyl isocyanate. As the polyisocyanate, furthermore, there can be used adducts having NCO groups at their terminals obtained by reacting the polyisocyanate with polyol compounds (e.g., ethylene glycol, propylene glycol, 1,4-butanediol, neopentyl glycol, hexylene glycol, diethylene glycol, dipropylene glycol, triethylene glycol, glycerol, trimethylolpropane, polyether polyols, polyester polyols, acrylic polyols, epoxypolyols, etc.) or polyamine compounds (e.g., ethylenediamine, hexamethylenediamine, phenylenediamine, polyetherpolyamines, polyamidepolyamines) at excessive NCO/OH or $NH_2$ ratios. The reaction between the polyisocyanate and carbon dioxide is carried out by blowing carbon dioxide gas into the polyisocyanate in the presence of a catalyst. As the catalyst, there can be used tertiary phosphines, arsenic compounds and hydroquinones, tertiary phosphines being particularly effective. Normally, the reaction temperature is in the range of about $-10°$ C. to 100° C., and the reaction time is in the range of 1 to 20 hours. In order to terminate the reaction and preserve the reaction product stably, various compounds are normally added thereto. As such reaction terminating agent and stabilizer, there can be used alkylating agents, acylating agents, acids, ester derivatives, phenols, peroxides, sulfur, polysulfides, metal sulfides, halides, etc.

The reaction product obtained contains, in addition to the polyisocyanate compound having trione rings, the unreacted isocyanate monomer, low molecular weight substances, etc., and these can be removed by a suitable procedure, such as distillation, extraction and crystallization, to give the polyisocyanate compound having the trione rings (I).

Specific examples of such a compound (I) include, for example, a diisocyanate compound having one trione ring, a diisocyanate compound having two trione rings and a diisocyanate compound having three trione rings, but their mixtures may be used, because the reaction normally produces such mixtures.

The active hydrogen compound (II) includes, for example, a polyol containing at least two hydroxyl groups and having a molecular weight of 200 to 10,000, preferably 400 to 6,000. As the polyol, use can be made of, for example, polyester polyols, polyether polyols, polyetherester polyols, polyesteramide polyols, polyhydroxyalkanes (e.g., polybutadiene polyols, etc.), oil-modified polyols and castor oil; these polyols are known as raw materials which are normally used in the field of polyurethane.

The compound having both hydroxyl and acryloyloxy (or methacryloyloxy) groups in the molecule (III) includes, for example, a hydroxyalkyl acrylate, such as hydroxyethyl acrylate, hydroxypropyl acrylate, hydroxybutyl acrylate, hydroxyhexyl acrylate, hydroxyheptyl acrylate, hydroxypentyl acrylate and hydroxyoctyl acrylate; a hydroxyalkyl methacrylate, such as hydroxyethyl methacrylate, hydroxypropyl methacrylate, hydroxybutyl methacrylate, hydroxyhexyl methacrylate, hydroxyheptyl methacrylate, hydroxypentyl methacrylate and hydroxyoctyl methacrylate; a monoester of polyhydric alchols with acrylic acid, such as trimethylolpropane monoacrylate and trimethylolpropane monomethacrylate; a monoester of polyhydric alcohols with methacrylic acid, such as trimethylolmethane monomethacrylate and trimethylolpropane monomethacrylate; a monoester of polyols with acrylic acid, such as triethylene glycol monoacrylate and polyethylene glycol monoacrylate; and a monoester of polyols with methacrylic acid, such as triethylene glycol monomethacrylate and polyethylene glycol monomethacrylate. Among these compounds (III), the hydroxyalkyl acrylate and the hydroxyalkyl methacrylate can be preferably used. From the practical point of view, hydroxyethyl acrylate and hydroxyethyl methacrylate are preferable.

The epoxy compound, a raw material for the ester resin (b) in the present invention, includes a glycidyl ether of polyhydric alcohol or polyhydric phenol having a molecular weight per epoxide group of about 150 to 2000. The specific example includes, for example, a diglycidyl ether (Epikote 828, 1001, 1004, etc.; produced by Shell Chemical Co.) prepared by the reaction of bisphenol A with epichlorohydrin or methylepichlorohydrin; a polyglycidyl ether obtained by the reaction of polyols, such as glycerol, with epichlorohydrin or methylepichlorohydrin, and a polyglycidyl ether prepared by the reaction of novolac resins with epichlorohydrin or methylepichlorohydrin. In addition, monoepoxide compounds may be used as the epoxy compound. The unsaturated carboxylic acid, another raw material, includes, for example, an organic monocarboxylic acid having an ethylenically unsaturated bond, such as acrylic acid and methacrylic acid, and an organic dicarboxylic acid having an $\alpha,\beta$-unsaturated double bond, such as maleic acid and fumaric acid.

The reaction of the epoxy compound with the unsaturated carboxylic acid may be carried out at such a ratio as may be 0.5 to 1.5 carboxyl groups per epoxy group, and for example, is allowed to proceed at the presence of a known esterification catalyst, such as dimethylaniline, at a temperature of about 100° to 150° C. for 8 to 10 hours. Although the unreacted raw materials may be removed from the resulting reaction product, the reaction product can normally be used as the ester resin (b) of the present invention. The ester resin has normally one or more reactive double bonds and normally exhibits an acid value of 1 to 20.

As the vinyl monomer usable in the present invention, there may be mentioned those capable of undergoing a copolymerization reaction with the component (a) or (c) and capable of decreasing the viscosity of the components (a) and (b), such as styrene, $\alpha$-methylstyrene, vinyltoluene, vinyl acetate, ethyl acrylate, ethyl acrylate, methyl methacrylate, ethyl methacrylate, acrylonitrile and methacrylonitrile.

The in-mold coating composition according to the present invention contains the above-described components (a), (b) and (c) as the essential components. It is assumed that the component (a) is responsible for such properties as flexibility, toughness and adherence of the coating film, the component (b) being concerned similarly in such properties as rigidity, chemical resistance and adherence of the coating film, and the component (c) participates in the viscosity and curing characteristics of the present composition. As the composition of the present invention, there can be used that prepared by formulating ordinarily 50 to 500 (preferably 70 to 300) parts by weight of the component (b) and 50 to 500 (preferably 70 to 300) parts by weight of the component (c) to 100 parts by weight of the component (a). In commercial use, the composition of the present invention allows the use of catalysts, mold releasing agents, fillers, etc. in addition to the three components, and can permit pigments, dyestuffs, levelling agents, defoaming agents, plasticizers, etc. if desired. As the catalyst, there may be mentioned organic peroxides, such as benzoyl peroxide, cyclohexanone peroxide, di-tert-butyl peroxide, dicumyl peroxide, tert-butyl perbenzoate or 1,1-bis(t-butylperoxy)-3,3,5-trimethylcyclohexanone; the mold releasing agent includes Zelec UN ® (produced by Du Pont de Nemours), zinc stearate, calcium stearate, etc.; and the filler includes calcium carbonate, carbon black, aluminum hydroxide, talc, etc.

In applying the composition according to the present invention to the in-mold coating method to coat a molded product, the heretofore employed method can be used as such. Thus, a fiber-reinforced thermosetting resin compound referred to as SMC, BMC, etc. is subjected to heat-compression molding with use of the conventional method, thereafter the mold being parted a little bit to inject the composition of the present invention, and the mold is closed again to allow the composition to flow onto the surface of the molded product and then to cure. The curing temperature for the formation of such a coating film is about 90° to 160° C, while the curing time is about 0.5 min. to 10 min. With reference to the amount of the composition of the present invention to be used, the composition may be normally used in such quantities as may provide a cured coating film with a thickness ranging from about $20\mu$ and $500\mu$.

The molded product coated by the procedure involving the use of the composition of the present invention, because of its exceedingly superior flowing properties, is entirely free from any uncoated, exposed part, and produces no defects, such as cavities and pinholes, and exhibited an even and smooth surface. The composition of the present invention shows exceptionally excellent adherence toward molded products, particularly molded products from fiber glass reinforced unsaturated polyester compounds, and does not peel-off at all. When various kinds of paints are coated on the coating film formed by coated with use of the composition of the present invention, they exhibited exceedingly good adherence.

The reference examples and examples are described in the following to illustrate the present invention more specifically.

REFERENCE EXAMPLE 1

A 1500 g portion of a diisocyanate (with an NCO content=19.3%) having one trione ring and two isocyanate groups per molecule formed by the reaction of 1,3-bis(isocyanatomethyl)cyclohexane with carbon dioxide gas was reacted with 3440 g of polypropylene glycol with an average molecular weight of 1,000 having hydroxyl groups at both terminals at 80° C. for 4 hours to give a urethane prepolymer having terminal isocyanate groups and trione rings. The urethane prepolymer showed an isocyanate content of 5.77% and a viscosity at 25° C. of 41,000 cps. 200 g of the prepolymer was reacted with 26.0 g of hydroxyethyl acrylate in the presence of 0.01 g of dibutyltin dilaurate at 80° C. for 5 hours to give a viscous liquid showing no IR absorption due to the isocyanate and having the polymerizable double bonds at the terminals and the trione rings in the molecule.

REFERENCE EXAMPLE 2

A 750 g portion of the diisocyanate (with an NCO content of 19.3%) having one trione ring and two isocyanate groups per molecule as described in Reference Example 1 was reacted with 3400 g of ethylene propylene adipate (with an ethylene/propylene ratio of 7/3) with an average molecular weight of 2,000 having hydroxyl groups at both terminals at 80° C. for 4 hours to give a urethane prepolymer having terminal isocyanate groups and trione rings. The prepolymer showed an isocyanate content of 3.35%. 200 g of the prepolymer was reacted with 15.3 g of hydroxyethyl methacrylate in the presence of 0.005 g of dibutyltin dilaurate at 80° C. for 5 hours to give a viscous liquid showing no IR absorption spectrum due to the isocyanate and having the polymerizable double bonds at the terminals and the trione ring in the molecule.

REFERENCE EXAMPLE 3

A 120 g portion of 1,3-bis(isocyanatomethyl)cyclohexane was reacted with 620 g of polypropylene glycol with an average molecular weight of 1,000 having hydroxyl groups at both terminals at 80° C. for 4 hours to yield a urethane prepolymer having a viscosity of 18,000 cps (at 25° C.) and an isocyanate content of 7.0%. Furthermore, the prepolymer was reacted with 117 g of hydroxyethyl acrylate in the presence of 0.04 g of dibutyltin dilaurate at 80° C. for 3 hours to give a viscous liquid.

REFERENCE EXAMPLE 4

A 300 g portion of a diglycidyl ether type of an epoxy resin (Epikote® 828, produced by Shell Chemical Co.) was reacted with 147 g of methacrylic acid, 0.70 g of triethylamine and 0.002 g of hydroquinone at 120° C. to give an ester resin with an acid value of 8.5.

And then, 192 g of styrene monomer was added to the ester resin to dissolve the ester resin to give a solution with a viscosity of 465 cps.

REFERENCE EXAMPLE 5

In accordance with the following formulation, a sheet molding compound (SMC) was manufactured.
An unsaturated polyester obtained from propylene glycol and maleic anhydride: 60 parts
A 30% styrene solution of polystyrene (with a molecular weight of 150,000): 40
p-Benzoquinone: 0.001
Calcium carbonate: 150
Zinc stearate: 5.0
Magnesium oxide: 1.1
TBPB (tert-butyl perbenzoate): 1.2
Glass (SM-14 produced by Nippon Glass-fiber Co. of Japan): 25%

REFERENCE EXAMPLE 6

In accordance with the following formulation, a sheet molding compound (SMC) was manufactured.
An unsaturated polyester as used in Reference Example 5: 55 parts
A 30% styrene solution of a styrenebutadiene block copolymer: 45
Calcium carbonate: 200 parts
Zinc stearate: 7.0
Magnesium oxide: 1.0
TBPB: 1.0
Glass (SM-14): 27%

REFERENCE EXAMPLE 7

A 370 g portion of a diglycidyl ether type of an epoxy resin (Epikote® 828, produced by Shell Chemical Co.), 30 g of maleic anhydride, 0.50 g of triethylamine and 0.003 g of p-benzoquinone were subjected to a reaction at 120° C. to give an epoxy-modified maleic acid with an acid value of 3.2. And then, 200 g of styrene monomer was added to the modified maleic acid to dissolve the modified maleic acid. There was obtained a solution with a viscosity of 465 cps.

EXAMPLE 1 to 7

In accordance with the various formulations as shown in the following table, compositions for in-mold coating were prepared, and after a sheet molding compound was compression-molded, in-mold coating was performed immediately with use of the compositions. Molding and in-mold coating conditions were as shown in the following.
Molded product of SMC: 300×300×3 (m/m)
Curing temp. and time of SMC: 145° C., 90 sec.
Curing pressure of SMC: 100 kg/cm$^2$
Charged amount of the in-mold coating material: 12 g
Curing temp. and time of the in-mold coating material: 145° C., 60 sec.
Curing pressure of the in-mold coating material: 45 kg/cm$^2$ With the in-mold coated products, the adherence between coating film and surface of molded product was examined under normal conditions and after immersion in warm water at 40° C. for 10 days in accordance with the cross-cut adhesion test. The results are shown in the following table.

TABLE 1

| Component of the composition | Example 1 | Example 2 | Example 3 | Reference Example 1 | Example 4 | Example 5 | Example 6 | Example 7 |
|---|---|---|---|---|---|---|---|---|
| (a) | 28 parts of Reference Example 1 | 28 parts of Reference Example 1 | 28 parts of Reference Example 2 | 28 parts of Reference Example 3 | 17.5 parts of Reference Example 1 | 17.5 parts of Reference Example 1 | 17.5 parts of Reference Example 2 | 28 parts of Reference Example 1 |
| (b) | 60 parts of Reference Example 4 | 60 parts of Reference Example 4 | 60 parts of Reference Example 4 | 60 parts of Reference Example 4 | 75 parts of Reference Example 4 | 75 parts of Reference Example 4 | 75 parts of Reference Example 4 | 60 parts of Reference Example 7 |
| (c) Styrene monomer | 12 | 12 | 12 | 12 | 7.5 | 7.5 | 7.5 | 80 |
| Calcium carbonate | 80 | 80 | 80 | 80 | 120 | 120 | 120 | 80 |
| TBPB | 1.5 | 1.5 | 1.5 | 1.5 | 1.5 | 1.5 | 1.5 | 1.5 |

TABLE 1-continued

| Component of the composition | Example 1 | Example 2 | Example 3 | Reference Example 1 | Example 4 | Example 5 | Example 6 | Example 7 |
|---|---|---|---|---|---|---|---|---|
| Mold releasing agent (Zelec ® UN) | 0.2 | 0.2 | 0.2 | 0.2 | 0.3 | 0.3 | 0.3 | 0.2 |
| Storage stability (25° C. 1 month) | good | good | good | good | good | good | good | good |
| Type of SMC | Reference Example 5 | Reference Example 6 | Reference Example 5 | Reference Example 6 | Reference Example 5 | Reference Example 6 | Reference Example 5 | Reference Example 5 |
| Adherence of the in-mold coating film: | | | | | | | | |
| Normal | 100 | 100 | 100 | 70 | 100 | 100 | 100 | 100 |
| Water resistance | 100 | 100 | 100 | 50 | 100 | 100 | 100 | 100 |

TBPB: t-Butyl perbenzoate

As is evident from the table, the covering films derived from the compositions of the present invention exhibit excellent adherence to molded products.

We claim:

1. A one-package composition for in-mold coating, which contains (a) a urethane compound having at least two terminal acryloyloxy or methacryloyloxy groups and at least one 1-oxa-3,5-diazine-2,4,6-trione ring in the molecule, (b) an ester resin having at least one reactive double bond prepared by the reaction of an epoxy compound with an unsaturated carboxylic acid and (c) a vinyl monomer.

2. The one-package composition for in-mold coating according to claim 1, wherein the composition is that prepared by formulating 50 to 500 parts by weight of the component (b) and 50 to 500 parts by weight of the component (c) to 100 parts by weight of the component (a).

3. The one-package composition for in-mold coating according to claim 1, wherein the component (a) is produced by reacting a polyisocyanate compound having at least one 1-oxa-3,5-diazine-2,4,6-trione ring in the molecule with an active hydrogen compound at an isocyanate/active hydrogen ratio in the range of 1.3 to 4.0 to produce an isocyanate-terminated urethane prepolymer having the trione rings in the molecule and, then, reacting the prepolymer with a compound having hydroxyl and acryloyloxy or methacryloyloxy groups in the molecule at an isocyanate/hydroxyl ratio in the range of 1.0 to 0.5.

4. The one-package composition for in-mold coating according to claim 1, wherein the epoxy compound is a glycidyl ether of polyhydric alcohol or polyhydric phenol having a molecular weight per epoxide group of about 150 to 2000.

* * * * *